UNITED STATES PATENT OFFICE.

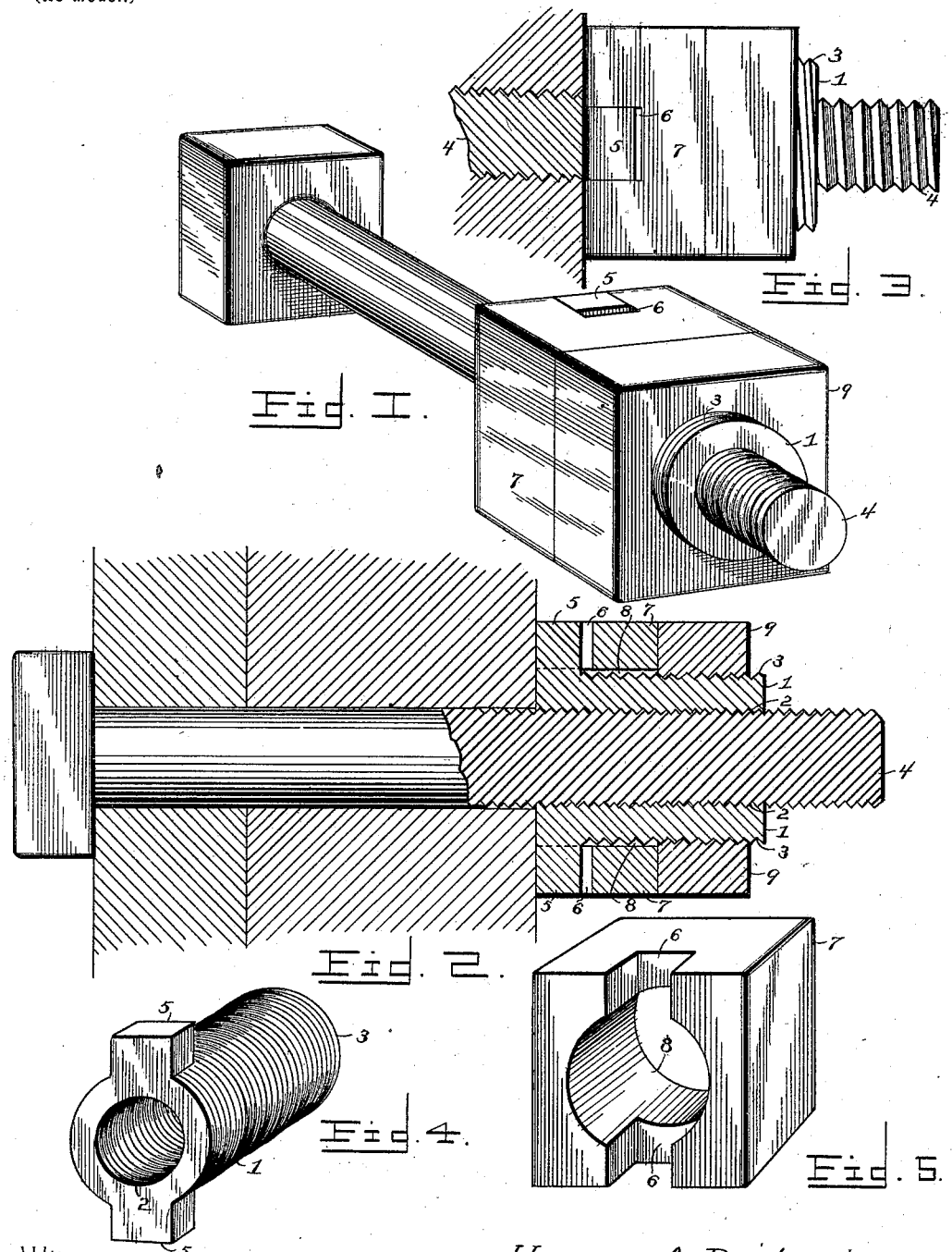

HARRY A. DEITERS, OF SPENCER, WEST VIRGINIA, ASSIGNOR OF ONE-HALF TO EDWARD L. BILL, OF SAME PLACE.

NUT-LOCK.

SPECIFICATION forming part of Letters Patent No. 646,897, dated April 3, 1900.

Application filed January 15, 1900. Serial No. 1,485. (No model.)

*To all whom it may concern:*

Be it known that I, HARRY A. DEITERS, a citizen of the United States, residing at Spencer, in the county of Roane and State of West Virginia, have invented a new and useful Nut-Lock, of which the following is a specification.

The invention relates to improvements in nut-locks.

The object of the present invention is to improve the construction of nut-locks and to provide a simply, inexpensive, and efficient device adapted to be used in connection with an ordinary bolt and a common nut without necessitating any alteration in the construction of either of such parts and capable of effectually locking a nut against accidental unscrewing and of enabling the same to be readily removed by a wrench without injuring the parts or impairing the future usefulness of the same.

The invention consists in the construction and novel combination and arrangement of parts hereinafter fully described, illustrated in the accompanying drawings, and pointed out in the claims hereto appended.

In the drawings, Figure 1 is a perspective view of a nut-lock constructed in accordance with this invention. Fig. 2 is a longitudinal sectional view of the same. Fig. 3 is a plan view of the nut-lock and a portion of the bolt. Fig. 4 is a detail perspective view of the sleeve. Fig. 5 is a similar view of the block or washer.

Like numerals of reference designate corresponding parts in all the figures of the drawings.

1 designates a cylindrical sleeve provided with interior and exterior screw-threads 2 and 3 and designed to be screwed on the threaded portion of a bolt 4 of the ordinary construction, as clearly illustrated in Fig. 2 of the accompanying drawings. The inner end of the sleeve is provided with a pair of oppositely-disposed integral lugs or arms 5, which are adapted to fit in corresponding recesses 6 of a block or washer 7, and the said lugs or arms, which are preferably rectangular, as illustrated in Fig. 4 of the drawings, may be of any other configuration.

The block or washer 7, which may be square, hexagonal, or of any other polygonal shape, is provided with a smooth central circular opening 8 to receive the sleeve, and the said recesses 6 are located at opposite sides of the central circular opening and are formed in the face of the block or washer adapted to abut against the part to be clamped or held by the bolt and nut. The opposite face of the block or washer is engaged by a nut 9, and as the recess 6 is deeper than the thickness of the lug or arm 5 the sleeve 3 is adapted to be drawn outward by the action of the nut, or, rather, the tendency of the nut is to draw the sleeve outward, thereby creating sufficient pressure on the threads of the bolt and the interior threads of the sleeve to prevent the latter from accidentally unscrewing. The same pressure is exerted on the threads of the nut 9 and the exterior threads of the sleeve, so that there is no liability of the nut accidentally unscrewing. The nut, which is shown rectangular in the accompanying drawings, may be of any other polygonal shape, and it is provided with a central threaded opening, the threads of which are adapted to engage the exterior threads of the cylindrical sleeve.

The block or washer 7 is interlocked with the sleeve by the lugs or arms 5 and the recesses 6, and in applying the parts to a bolt the block or washer is first placed on the sleeve, and the latter is then screwed on the bolt, the block or washer being adapted to receive a wrench for this purpose. The cylindrical sleeve may be screwed tightly against the parts to be clamped, and when the nut 9 is screwed against the contiguous face of the block or washer 7 the latter is forced against the part or object engaged by the said sleeve, and by forcing the nut forward the desired pressure on the head may be obtained.

The bolt is of the ordinary construction, and the nut, which is also constructed in the usual manner, has a threaded opening or bore of a diameter to fit the exteriorly-threaded sleeve instead of the bolt; but no change is necessitated in the construction of either the bolt or the nut.

It will be seen that the nut-lock is exceedingly simple and inexpensive in construction, that it possesses great strength, durability, and efficiency, and that it is capable of creating a sufficient pressure on the threads, transversely of the length of the same and longitudinally of the bolt, to effectually prevent the nut or the sleeve from accidentally unscrewing. It will also be apparent that the pressure may be produced by the action of an ordinary wrench and that the parts may be relieved of pressure by such a tool and that the nut-lock may be locked and unlocked without injuring any of the parts.

Changes in the form, proportion, size, and the minor details of construction within the scope of the appended claims may be resorted to without departing from the spirit or sacrificing any of the advantages of this invention.

What is claimed is—

1. A nut-lock comprising a sleeve having interior and exterior screw-threads and adapted to be screwed on a bolt, a block or washer detachably interlocked with the sleeve and capable of a limited movement longitudinally thereof, and a nut engaging the exterior screw-threads of the sleeve and adapted to bear against the adjacent face of the block or washer, whereby a pressure longitudinal of the bolt is exerted on the screw-threads, substantially as described.

2. In a device of the class described, the combination with a bolt, of a sleeve having interior and exterior screw-threads and arranged on the bolt, a washer or block interlocked with the sleeve and capable of movement longitudinally thereof, and a nut arranged on the exterior of the sleeve and engaging the block or washer, substantially as described.

3. A device of the class described comprising a cylindrical sleeve having interior and exterior screw-threads and provided with an arm or lug, a block or washer having a smooth opening to receive the sleeve and interlocked with the arm or lug, and a nut engaging the exterior screw-threads of the sleeve and abutting against the block or washer, substantially as described.

4. A device of the class described comprising a cylindrical sleeve having interior and exterior screw-threads and provided with a pair of lugs or arms, a block or washer having a smooth opening and fitting on the sleeve and provided with recesses receiving the lugs or arms and being of a greater depth than the thickness of said lugs or arms, and a nut arranged on the exterior of the sleeve and engaging the block or washer, substantially as described.

In testimony that I claim the foregoing as my own I have hereto affixed my signature in the presence of two witnesses.

HARRY A. DEITERS.

Witnesses:
R. W. HAMRICK,
J. M. CLEAVENGER.